Figure 1:
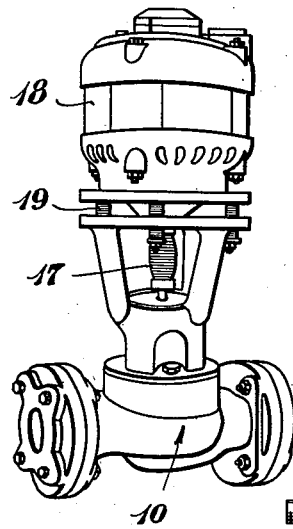

Sept. 19, 1944.  M. O. THRUSH  2,358,670
WATER CIRCULATOR
Filed May 8, 1941

Inventor
M. O. THRUSH,
By A. Yates Dowell.
Attorney

Patented Sept. 19, 1944

2,358,670

UNITED STATES PATENT OFFICE 2,358,670

WATER CIRCULATOR

Marquis O. Thrush, Peru, Ind., assignor to The Thrush Company, Peru, Ind.

Application May 8, 1941, Serial No. 392,527

12 Claims. (Cl. 308—36.1)

This invention relates to water circulators for hot water heating systems and the like, and the present application constitutes a continuation in part of my copending application Serial No. 358,736 filed September 27, 1940.

Water circulators, particularly when installed in domestic heating systems are ofttimes called upon to operate indefinitely without attention from the occupant of the home or servicing by a competent mechanic. It is therefore important that the circulator have some dependable type of lubricating means. It is also important that the circulator be of relatively inexpensive construction, since heating systems utilizing forced circulation are now installed in a large percentage of homes irrespective of the cost of the dwellings.

It is an object of the present invention to provide a circulator embodying an automatic circulating lubricating system for the impeller shaft which is of inexpensive and relatively simple design, yet at the same time operates to maintain the impeller shaft well lubricated throughout the life of the circulator without requiring manual attention.

Another object of the invention is to provide a water circulator having an automatic circulating lubricating system for the impeller shaft which is effectively sealed against infiltration of oil into the water chamber, or water into the oil chamber.

Another object of the invention is to provide a circulator having a radial bearing outside of the circulator or pump casing and a coacting thrust bearing within the casing with an automatic circulating lubricating system for the radial bearing so constructed that oil is prevented from mixing with water and contacting the thrust bearing irrespective of the contiguous relation of the latter to the oil circulating system.

A further object is to generally improve circulators of the type specified.

Figure 2:
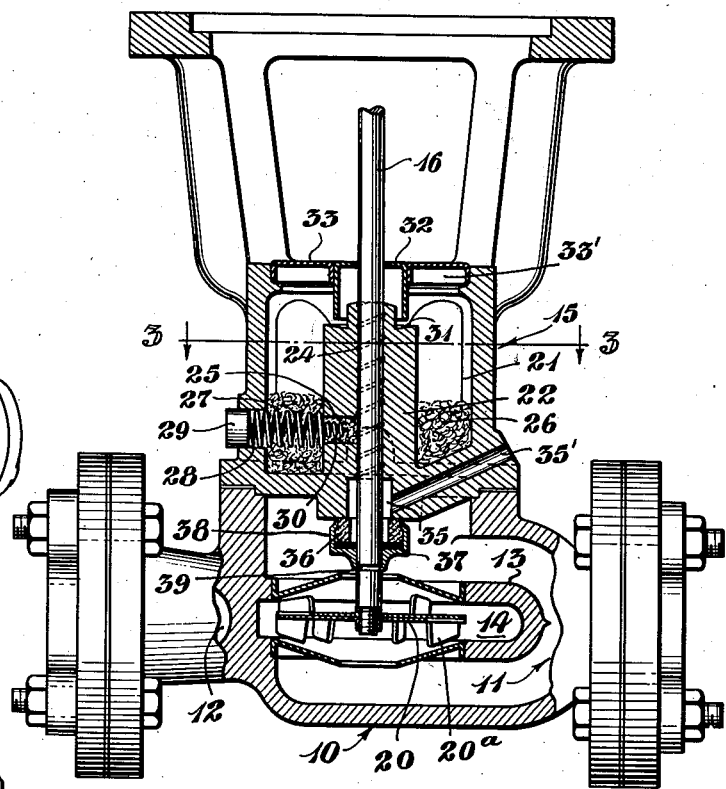
Figure 4:
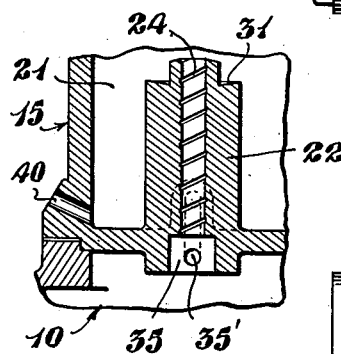
Figure 3:
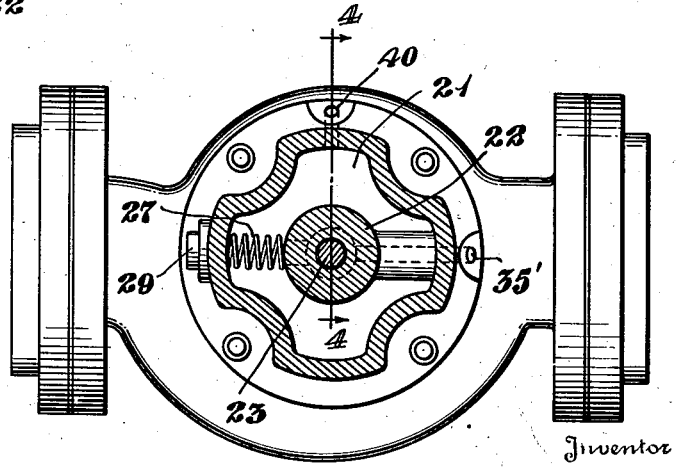

In the drawing:

Fig. 1 is a perspective view of a water circulator embodying the invention;

Fig. 2, an enlarged fragmentary detail section of the lower portion of Fig. 1; and Figs. 3 and 4, sections taken substantially on the lines 3—3 and 4—4 Figs. 2 and 3, respectively.

Referring to the drawing in detail, the main circulator casing or housing is generally indicated at 10 and is provided with an inlet conduit 11 and an outlet conduit 12. Within the casing 10 is a wall 13 which defines an impeller chamber 14 and also constitutes a dividing member for the water flowing into said chamber through the inlet 11. The casing or housing 10 has mounted thereon a bonnet 15, and an impeller shaft 16 extends through the central bearing portion of said bonnet and at its upper end is connected to a flexible shaft coupling 17, note Fig. 1. A driving motor 18 is mounted on the bonnet 15 through the medium of resilient connections 19, which latter connections serve as noise and vibration dampeners and ensure constant alignment of the motor shaft with the impeller shaft.

An impeller 20 is secured on the lower end of shaft 16 for rotation in the impeller chamber 14, said impeller preferably being made of sheet metal stampings of disc shape having blades 20 struck from the peripheral portion thereof. The particular construction of this impeller constitutes the subject matter of my copending application Serial No. 358,735 filed September 27, 1940, and need not therefore be described in the present instance.

The present invention is primarily concerned with an oil lubricating system for the impeller shaft bearing in the bonnet 15 and coacting water lubricated thrust bearing within the casing 10 whereby through a relatively simple construction and arrangement of parts effective lubrication for the shaft throughout the life of the circulator is ensured with a minimum liability of commingling of oil and water and consequent damage to the bearings.

The lower portion of the bonnet or bracket 15 is shaped to provide an oil chamber or reservoir 21 having a central upwardly projecting radial bearing member 22 with a bore 23 for the impeller shaft 16. The inner wall of the bore 23 is formed with a spiral oil-lift groove, indicated at 24, the oil being fed to said groove from the well or chamber 21 through a bore or slot 25 formed through the wall of the bearing member 22.

The spiral groove 24 is relatively shallow, being of a depth just sufficient to hold a quantity of oil in excess of the oil film between the shaft and adjacent smooth surface of the bore 23, so that when the shaft rotates it will exert pressure on the oil in the groove and cause the oil to pass upwardly in the bore around the shaft, the inherent cohesion between the oil particles or molecules causing a general upwardly movement of the oil from the well or chamber 21 to the top of the bearing, where it overflows and returns back to said well.

In circulators of the type with which the present invention is concerned, it is desirable that there be substantially no free oil in the well 21. Accordingly, absorbent material 26 is disposed in the base of the well and is also packed in the horizontal bore or slot 25, this absorbent material preferably not being saturated with oil beyond its absorption capacity. To maintain the absorbent material in the bore or slot 25 and ensure transfer of oil from the material to the groove 24, a spring 27 is inserted through a hole 28 formed in the exterior wall of the well 21 and is backed by a plug 29. The inner end of the spring is provided with a projection 30 which extends into the slot or bore 25 and continuously presses or urges the absorbent material against the shaft 16, the body portion of the spring 27 being of greater diameter than the bore 25 so that the surrounding wall of the latter forms a shoulder against which the spring abuts.

The upper extremity of the bearing member 22 is preferably formed with an annular ledge 31 which is undercut for a purpose to be described, and around the shaft 16 at this point is a dust cap 32 which may consist of a sheet metal stamping, the lower end of the dust cap surrounding the central projecting portion of the bearing member 22 above the ledge 31. The cap 32 is detachably mounted in a retainer 33 which also preferably consists of a sheet metal stamping detachably engaged in a recess 34 formed in the upper extremity of the chamber or well 21.

In shipping and handling circulators, they are ofttimes inverted or disposed horizontally, so that should there be any free oil in the chamber or well 26, it will have a tendency to flow towards the upper extremity of the chamber. When this happens in the herein described circulator, the oil will flow along the outer wall of the bearing member 22 and thence into the chamber 33' defined by the member 33. Due to the fact that the upper extremity of the bearing 22 is undercut, the oil will drop off the outer top edge of the undercut directly into the chamber 33'. It will thus be seen that this construction ensures against the escape of oil from the system during shipping or handling of the circulator.

The bore 23 for the impeller shaft 16 is enlarged at the base of the bearing member 22, defining a sump 35 for any water which might leak past seal ring 36 from the impeller chamber and to also receive any oil that might possibly leak downwardly through the bore 23. A drain or outlet passage 35' leads at an upward inclination from the sump 35 to the exterior of the impeller housing, the outlet end of said passage being above the level of said sump.

The passage 35' is in effect a vent through which water under pressure may escape.

Seal ring 36 preferably consists of carbon or analogous wear resisting material backed by a resilient cushioning member or washer 37, the carbon ring and resilient washer 37 being mounted in a holder 38 which at its lower end is rigidly secured to the impeller shaft 16 by means of a groove 39 formed circumferentially of the shaft with the metal of the holder 38 peened over into said groove.

The seal ring 36 is preferably mounted so that it has a limited universal or rocking movement in its holder 38. To accomplish this result, the carbon ring is preferably formed with a vertical spline groove and the metal of the holder is loosely splined into said groove, permitting the carbon ring to have a limited universal movement in the groove. This ensures equal wear on the bearing surface of the carbon ring throughout the life of the latter.

In the event the oil in the well 21 should require replenishing, an oil hole 40 is formed in the housing for said well and is accessible from the exterior of said housing, note particularly Fig. 3.

By referring to Fig. 2, it will be noted that the spiral groove 24 is continued below the oil inlet opening 25 to a point adjacent the top of the sump 35. In this manner, there is a continual lifting force on the oil in this area so that there is substantially no leakage into the sump 35. When the circulator is idle, adhesive tension between the oil particles serves to hold the oil film in suspension around the impeller shaft at this point.

The operation of the circulator will be apparent in view of the foregoing description taken in conjunction with the drawing. The motor 18 drives the impeller 20 through the shaft 16, and as the impeller rotates, an upward thrust is exerted on the shaft due to head pressure and the unbalanced position of the impeller in the circulator chamber, and this thrust is taken by the carbon sealing and bearing ring 36. The absorbent material 26 preferably carries just enough oil to ensure proper lubrication, there being sufficient material to carry this amount of oil in suspension without bringing the absorbent material to full saturation point. There is thus little or substantially no free oil in the chamber 21 so that in shipment no oil can be lost should the package containing the circulator be inverted or the circulator disposed on its side.

As the impeller shaft 16 rotates, oil is carried upwardly in the spiral groove 24, the cohesive action between the oil in the groove 24 and the film of oil around the shaft causing a general upwardly movement of the oil to the top of the bearing member 22, at which point it overflows onto the ledge 31 and then downwardly into the well 21.

The seal ring 36 will normally prevent leakage of water under pressure from the impeller chamber, but should any pass this seal, it will be trapped in the sump 35, from which it may escape through the outlet 35'.

The housing or casting for the bonnet or bracket 15 is preferably designed to form the well 21 and the radial bearing member 22 as an integral unit. The groove 39 in the impeller shaft 16 serves to definitely locate the holder 38 and the seal ring 36. In assembling the parts of the circulator, the impeller shaft 16 with the seal ring 36 and holder 38 together with the impeller 20 thereon may be located in the main casing 10, after which the bonnet 15 may be inserted over the shaft 16 and secured in place on the casing.

A bearing of the type herein disclosed eliminates grease retainers and reduces wear on the running parts to a minimum due to the fact that there is a constant film of oil between the shaft and bearing. Furthermore, the oil cannot combine with the water to form an abrasive with resultant wear on the seal ring and noise or squeaks which arise when such action takes place. Also, expensive bronze bearings may be replaced with less expensive cast metal bearings. The time required for the assembling operation is materially reduced and the circulator as a whole rendered less expensive while at the same time more efficient and susceptible of longer life.

It will be understood that certain limited changes in construction and design may be adopted without departing from the spirit or scope of the invention as defined by the appended claims.

What is claimed is:

1. In a circulator for hot water heating systems, a casing provided with a lower impeller chamber, a bonnet mounted on said casing and formed with an oil chamber and a bottom wall overlying said impeller chamber and serving as a partition between the impeller chamber and oil chamber, said wall being formed with a bearing member projecting upwardly into said oil chamber and formed with a bearing bore, an impeller shaft rotatably mounted in said bearing bore, said bore being formed with a spiral groove circulation of oil upwardly in the bore around the shaft and thence back to the oil chamber, the base of said bearing member being formed with an opening communicating the oil chamber with said bore, a seal ring fixed on the impeller shaft and having a sealing contact with the adjacent under-surface of the partition wall around said shaft, said bore being enlarged at its lower extremity to provide a space for entrapment of any water that may leak past the seal ring and also any oil that may leak from said oil chamber, said spiral groove being continued downwardly in the bore between said communicating opening and said space to counteract any tendency of the oil to leak into said space.

2. In a circulator for hot water heating systems, housing means providing a lower impeller chamber and an upper oil chamber with a partition wall therebetween, a radial bearing member fixed to said wall and projecting upwardly therefrom into the oil chamber, an impeller shaft rotatably mounted in a bearing bore formed in said bearing member and projecting into said impeller chamber, an impeller on said shaft, a spiral groove on the inner wall of said bearing member communicating at the base of the latter with said oil chamber and whereby through rotation of the shaft oil is caused to circulate from the oil chamber upwardly through said bearing bore and back to the oil chamber, a seal ring secured to said shaft at the base of the bearing member within the lower chamber, the wall around the shaft above said seal ring being formed with a space providing a sump whereby should any water pass said seal it will be trapped in said sump, and means permitting water to escape from said sump.

3. In a circulator for hot water heating systems, housing means providing a lower impeller chamber and an upper oil chamber with a partition wall therebetween, a radial bearing fixed to said wall and projecting upwardly therefrom into said oil chamber, an impeller shaft rotatably mounted in said bearing and projecting into said impeller chamber, an impeller on said shaft, a spiral groove on the inner wall of said bearing communicating with said oil chamber at the base of the bearing and whereby oil is caused to circulate upwardly in the bearing around the shaft due to rotation of the latter and thence back to the impeller chamber, and means preventing infiltration of water from said impeller chamber to said oil chamber.

4. In a circulator for hot water heating systems, housing means providing a lower impeller chamber and an upper oil chamber with a partition wall therebetween, a radial bearing member fixed to said wall and projecting upwardly therefrom into the oil chamber, said bearing member being provided with a bearing bore, an impeller shaft rotatably mounted in said bore, a spiral groove associated with said bore and shaft to cause a circulation of oil upwardly through the bore around the shaft and thence back to the oil chamber, the base of said radial bearing member being formed with an opening communicating the oil chamber with said bearing bore, absorbent material in said oil chamber to avoid any substantial amounts of free oil, a cap member fixed in the housing and closing the upper end of the oil chamber, said cap member having a downwardly projecting wall encircling said shaft and in substantial alinement with the top of the bearing member and the latter having an undercut circumferential edge of greater diameter than said encircling wall to effect drainage of any free oil into the closed upper end of the oil chamber, in the event the circulator should become inverted.

5. In a circulator for hot water heating systems, housing means providing a lower impeller chamber and an upper oil chamber with a partition wall therebetween, a radial bearing member fixed to said wall and projecting upwardly therefrom into the oil chamber, said bearing member being provided with a bearing bore, an impeller shaft rotatably mounted in said bore, a spiral groove associated with said bore and shaft to cause a circulation of oil upwardly through the bore around the shaft and thence back to the oil chamber, a cap member fixed in the housing and closing the top of the oil chamber, the top of said bearing member being formed with an undercut surface and said cap member having a downwardly projecting wall encircling the shaft and of less diameter than the said undercut top surface of the bearing member and whereby should the circulator be inverted, any free oil from the oil chamber will be drained outside of said circumferential wall into the upper end of the oil chamber.

6. In a circulator for hot water heating systems, housing means providing a lower impeller chamber and an upper oil chamber with a partition wall therebetween, a radial bearing member fixed to said wall and projecting upwardly therefrom into the oil chamber, said bearing member being provided with a bearing bore having a spiral groove on the interior thereof of a depth just sufficient to contain a relatively heavy film of oil, an impeller shaft rotatably mounted in said bore, absorbent material in said oil chamber in an amount sufficient to hold a quantity of lubricating oil in suspension, the base of said radial bearing member being formed with an opening communicating the oil chamber with said bearing bore, rotation of the shaft exerting pressure on the oil in the spiral groove and causing an upward movement on the oil around the shaft, the oil passing upwardly in said groove acting through adhesive tension on the remaining film of oil around the shaft to cause a general upward movement of the oil to the top of the bearing and over the latter back into the oil chamber.

7. In a circulator for hot water heating systems, housing means providing a lower impeller chamber and an upper oil chamber with a partition wall therebetween, a radial bearing member fixed to said wall and projecting upwardly therefrom into the oil chamber, said bearing member being provided with a bearing bore, an impeller shaft rotatably mounted in said bore, a spiral groove associated with said bore and shaft to cause a circulation of oil upwardly through the bore around the shaft, the base of said radial bearing member being formed with an opening communicating the oil chamber with said bearing bore, absorbent material in said oil chamber and also in said opening in contact with said shaft, and resilient means engaging the absorbent material in said opening to retain the said material in contact with the shaft.

8. In a circulator for hot water heating systems, housing means providing a lower impeller chamber and an upper oil chamber with a partition wall therebetween, a radial bearing member fixed to said wall and projecting upwardly therefrom into the oil chamber, said bearing member being provided with a bearing bore having a spiral groove on the interior thereof, an impeller shaft rotatably mounted in said bore, said spiral groove being arranged for upward circulation of oil in the bore around the impeller shaft, absorbent material in the oil chamber in an amount sufficient to hold a quantity of lubricating oil in suspension, the base of said radial bearing member being formed with an opening communicating the oil chamber with said bearing bore, part of the absorbent material being packed in said opening, and means retaining the absorbent material in said opening to ensure transfer of oil from said material to said groove.

9. A circulator comprising a housing providing an impeller chamber, a shaft extending through the housing into the chamber, a bearing for the shaft, an oil sump associated with the bearing, an oil passage between the sump and the bearing for supplying oil to the bearing, oil movement producing means for causing the oil to flow from said sump along the bearing and back to said sump, cooperating sealing faces on the shaft and the housing for preventing liquid around the impeller from entering the bearing, said oil movement producing means being designed to cause travel of oil in the bearing in a direction away from said sealing faces, and means for venting fluid to the atmosphere from the vicinity of the joint between the sealing faces.

10. In a device of the character described, a body provided with a spirally grooved bore forming a shaft bearing, a shaft journalled in said bore, driving and driven means associated with the shaft, each of said driving and driven means being adapted to operate in different mediums, means for preventing commingling of said mediums around said shaft through said bore, an oil supply chamber spaced from the bearing but having communication therewith for supplying oil to the contacting surfaces of the bearing and shaft, the cooperating structure of the shaft and bearing serving to cause oil to travel along the shaft upon relative rotation between the shaft and bearing, and means for causing the oil to be collected into the oil supply chamber as it exudes from said bearing.

11. A device of the character described comprising a housing providing an impeller chamber, a shaft extending through said housing into said impeller chamber for driving an impeller, a bearing for said shaft, means for maintaining said shaft lubricated within said bearing and for preventing fluid within the impeller chamber from mixing with the lubricant and vice versa, and means for affording escape of liquid from the surface of the shaft between the impeller chamber and said bearing.

12. In a device of the character described, a body having a spirally grooved bore providing a shaft bearing, a shaft journalled in said bearing, driving and driven means associated with said shaft, each of said driving and driven means being adapted to operate in different fluids, means providing a seal for preventing commingling of said fluids around said shaft through said bore, an oil supply chamber spaced from said bearing but having communication therewith at its top and downwardly therefrom in order that oil may be supplied to the contacting surfaces of the bearing and shaft, capillary means for holding oil in said oil supply chamber, rotation of said shaft in said spirally grooved bearing serving to cause oil to travel along the shaft and be discharged from the top of the bearing and be collected in said oil supply chamber, the bearing and body being provided with a chamber at the place of sealing and a vent to the atmosphere from said chamber, said chamber being for the collection of fluid getting past the bearing or past the seal, the lubricant in the bearing serving to prevent fluid getting by the seal from getting into the bearing but serving to maintain the bearing lubricated.

MARQUIS O. THRUSH.